(12) United States Patent
Mehta et al.

(10) Patent No.: US 8,284,073 B2
(45) Date of Patent: Oct. 9, 2012

(54) DOWNLINK WHILE PUMPS ARE OFF

(75) Inventors: Shyam B. Mehta, Missouri City, TX (US); Wayne Phillips, Houston, TX (US); Jean-Marc Follini, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 1210 days.

(21) Appl. No.: 12/104,578

(22) Filed: Apr. 17, 2008

(65) Prior Publication Data
US 2009/0261986 A1 Oct. 22, 2009

(51) Int. Cl.
*E21B 47/12* (2006.01)
*G01V 3/34* (2006.01)
(52) U.S. Cl. ............... 340/853.3; 340/853.7; 340/854.6
(58) Field of Classification Search ............ 340/853.3, 340/853.7, 854.6
See application file for complete search history.

(56) References Cited

U.S. PATENT DOCUMENTS

| | | | |
|---|---|---|---|
| 4,181,014 A * | 1/1980 | Zuvela et al. | 340/853.5 |
| 4,220,381 A * | 9/1980 | van der Graaf | 340/853.7 |
| 4,739,325 A * | 4/1988 | MacLeod | 340/854.6 |
| 5,010,333 A * | 4/1991 | Gardner et al. | 340/855.3 |
| 5,096,001 A | 3/1992 | Buytaert et al. | |
| 5,130,706 A * | 7/1992 | Van Steenwyk | 340/854.6 |
| 5,410,303 A * | 4/1995 | Comeau et al. | 340/853.3 |
| 5,602,541 A * | 2/1997 | Comeau et al. | 340/853.3 |
| 5,881,310 A * | 3/1999 | Airhart et al. | 710/3 |
| 5,883,516 A * | 3/1999 | Van Steenwyk et al. | 324/366 |
| 5,934,378 A | 8/1999 | Tchakarov | |
| 5,963,138 A | 10/1999 | Gruenhagen | |
| 6,105,690 A | 8/2000 | Biglin, Jr. et al. | |
| 6,150,954 A | 11/2000 | Smith | |
| 6,188,223 B1 * | 2/2001 | Van Steenwyk et al. | 324/370 |
| 6,396,276 B1 * | 5/2002 | Van Steenwyk et al. | 324/366 |
| 6,556,144 B1 * | 4/2003 | Roberts et al. | 340/854.1 |
| RE38,567 E | 8/2004 | Gruenhagen | |
| 6,839,000 B2 | 1/2005 | Das et al. | |
| 6,850,068 B2 * | 2/2005 | Chemali et al. | 324/369 |
| 6,920,088 B2 | 7/2005 | Wickramasinghe et al. | |
| 7,040,415 B2 * | 5/2006 | Boyle et al. | 175/40 |
| 7,151,466 B2 * | 12/2006 | Gabelmann et al. | 340/854.6 |

(Continued)

FOREIGN PATENT DOCUMENTS

EP 0987401 3/2000

(Continued)

*Primary Examiner* — Frederick L Lagman
(74) *Attorney, Agent, or Firm* — Kimberly Ballew

(57) ABSTRACT

A system and method for communicating with a downhole tool is disclosed. In one embodiment, a telemetry system for communicating with a downhole tool in a wellbore includes a first electrode. A modulated electric current flows from the first electrode through a formation to the downhole tool. The telemetry system also includes a downlink box, which provides the modulated electric current to the first electrode. The downhole tool comprises a sensor unit, which detects the modulated electric current. The telemetry system includes a second electrode that allows the modulated electric current to return to the downlink box. The telemetry system also includes an uplink telemetry, wherein the uplink telemetry does not comprise electromagnetic telemetry. In some embodiments, the downlink may be operated while mud pumps are turned off. The downlink may also be operated while the downhole tool is sending uplink telemetry by a method other than electromagnetic current.

19 Claims, 5 Drawing Sheets

U.S. PATENT DOCUMENTS

| | | | |
|---|---|---|---|
| 7,198,102 B2 | 4/2007 | Virally et al. | |
| 2004/0217880 A1* | 11/2004 | Clark et al. | 340/854.9 |
| 2005/0046585 A1* | 3/2005 | Dodge | 340/853.3 |
| 2005/0056465 A1 | 3/2005 | Virally et al. | |
| 2005/0087368 A1* | 4/2005 | Boyle et al. | 175/57 |
| 2006/0091307 A1* | 5/2006 | Griffiths et al. | 250/262 |
| 2006/0102340 A1 | 5/2006 | Virally et al. | |
| 2007/0029112 A1 | 2/2007 | Li et al. | |
| 2007/0057811 A1 | 3/2007 | Mehta | |
| 2007/0063865 A1* | 3/2007 | Madhavan et al. | 340/853.1 |
| 2007/0137898 A1 | 6/2007 | Virally et al. | |
| 2007/0188344 A1* | 8/2007 | Hache et al. | 340/853.1 |
| 2007/0247330 A1* | 10/2007 | Clark | 340/854.6 |

FOREIGN PATENT DOCUMENTS

| | | |
|---|---|---|
| JP | 06-260952 | 9/1994 |
| JP | 11-224395 | 8/1999 |
| KR | 10-2002-0085795 | 11/2002 |

* cited by examiner

DOWNLINK WHILE PUMPS ARE OFF

BACKGROUND OF THE INVENTION

1. Field of the Invention

This invention relates to the field of downlink systems and more specifically to downlink systems for communicating with a downhole tool in a wellbore.

2. Background of the Invention

Wells are generally drilled into the ground to recover natural deposits of hydrocarbons and other desirable materials trapped in geological formations in the Earth's crust. A well is typically drilled using a drill bit attached to the lower end of a drill string. The well is drilled so that it penetrates the subsurface formations containing the trapped materials for recovery of the trapped materials. The bottom end of the drill string conventionally includes a bottomhole assembly that has sensors, control mechanisms, and associated circuitry. As the drill bit is advanced through the formation, drilling fluid (e.g., drilling mud) is pumped from the surface through the drill string to the drill bit. The drilling fluid exits the drill bit and returns to the surface. The drilling fluid cools and lubricates the drill bit and carries the drill cuttings back to the surface.

During drilling, communications between the surface and the bottomhole assembly may be performed using a telemetry system, which allows for communications such as power, data, and directional commands between the bottomhole assembly and surface devices. Typical telemetry systems include a downlink, which is a communication from the surface to the bottomhole assembly. For instance, based on the data collected by the sensors in the bottomhole assembly, an operator may desire to send a command to the bottomhole assembly such as to change the drilling direction. Telemetry systems also include an uplink, which is a communication from the bottomhole assembly to the surface. For instance, an uplink may be a transmission of the data collected by the sensors in the bottomhole assembly such as orientation data or a confirmation that a downlink command was correctly received.

A conventional method of telemetry is mud pulse telemetry. Mud pulse telemetry is a method of sending signals, either downlinks or uplinks, by creating pressure and/or flow rate pulses or waves in the drilling mud. The pulses may be detected by sensors at the receiving location. For instance, in a downlink operation, a change in the pressure or flow rate of the drilling mud pumped down the drill string may be detected by a sensor in the bottomhole assembly. The pattern of the pulses, such as the frequency, timing and the amplitude, may be detected by the sensors and interpreted so that the command may be understood by the bottomhole assembly. Drawbacks to mud pulse telemetry include the temporary interruption of drilling operations to allow mud pumps at the surface to be cycled on and off, which provides the pulses. Further drawbacks to mud pulse telemetry include that downlink signals may not be sent when the mud pumps are cycled off. Additional drawbacks include the length of time involved in sending a downlink because of the measured depth of deviated wells as well as inefficiencies in downlinks when gas is entrained in the drilling mud. Drawbacks also include the cost of surface equipment and maintenance for mud bypass modulators and the like. In addition, drawbacks include the time that it takes to send information to the downhole tool and the surface equipment cost. For instance, to send a downlink command, the mud flow rate or the pressure is modulated. Such modulation is sensed by the sensors in the downhole tool. Because the mud pumps are large mechanical systems, a large inertia is involved, and therefore the flow rate may not be changed quickly, which results in an inefficiently long time to send the downlink commands. Another method to modulate the flow rate going downhole is to by-pass the flow from the stand pipe back to the mud pits, which is modulated by the surface modulator or valve. Drawbacks to such method include the considerable time and increased cost of the surface equipment, installation and maintenance. It also poses safety risks on the rig floor and added costs to mitigate the safety issues.

Another conventional method of telemetry is electromagnetic telemetry, which is a method of using electromagnetic telemetry tools to send the uplinks and surface equipment to send downlinks by injecting modulated current in the earth formation. Drawbacks to the conventional electromagnetic telemetry systems include that the downlink signals reaching the downhole tool are typically weak and may not be sensed while the uplink telemetry is being transmitted. Relatively small signals of the downlink may be overcome by large uplink signals transmitted by the downhole tool.

Further drawbacks in many cases of mud pulse telemetry and electromagnetic telemetry include deployment of special sensors in the downhole tool to detect signals, which may increase the cost of the system.

Consequently, there is a need for an improved telemetry system that allows for downlinks when mud pumps are cycled off or when the uplink telemetry is in progress. Further needs include improved detection and transmission of downlinks. Additional needs include an increase in the speed of sending downlinks. Further needs include a downlink telemetry system with reduced surface and downhole equipment cost and reduced maintenance.

BRIEF SUMMARY OF SOME OF THE PREFERRED EMBODIMENTS

These and other needs in the art are addressed in one embodiment by a telemetry system for communicating with a downhole tool in a wellbore. The telemetry system includes a first electrode. A modulated electric current flows from the first electrode through a formation to the downhole tool. The telemetry system also includes a downlink box, which provides the modulated electric current to the first electrode. The downhole tool has a sensor unit, which detects the modulated electric current. In addition, the telemetry system includes a second electrode that allows the modulated electric current to return to the downlink box. The telemetry system further includes an uplink telemetry, which does not comprise electromagnetic telemetry.

In another embodiment, these and other needs in the art are addressed by a method of communicating with a downhole tool in a wellbore. The method includes providing an electric current. In addition, the method includes modulating the electric current to provide a modulated electric current. The method further includes directing the modulated electric current into a formation. The method also includes detecting the modulated electric current at the downhole tool. Moreover, the method includes receiving the modulated electric current back at a surface of the wellbore. The method also includes providing an uplink telemetry, wherein the uplink telemetry does not comprise electromagnetic telemetry.

BRIEF DESCRIPTION OF THE DRAWINGS

For a detailed description of the preferred embodiments of the invention, reference will now be made to the accompanying drawings in which.

DETAILED DESCRIPTION OF THE PREFERRED EMBODIMENTS

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other embodiments for carrying out the same purposes of the present invention. It should also be realized by those skilled in the art that such equivalent embodiments do not depart from the spirit and scope of the invention as set forth in the appended claims.

Figure 1:
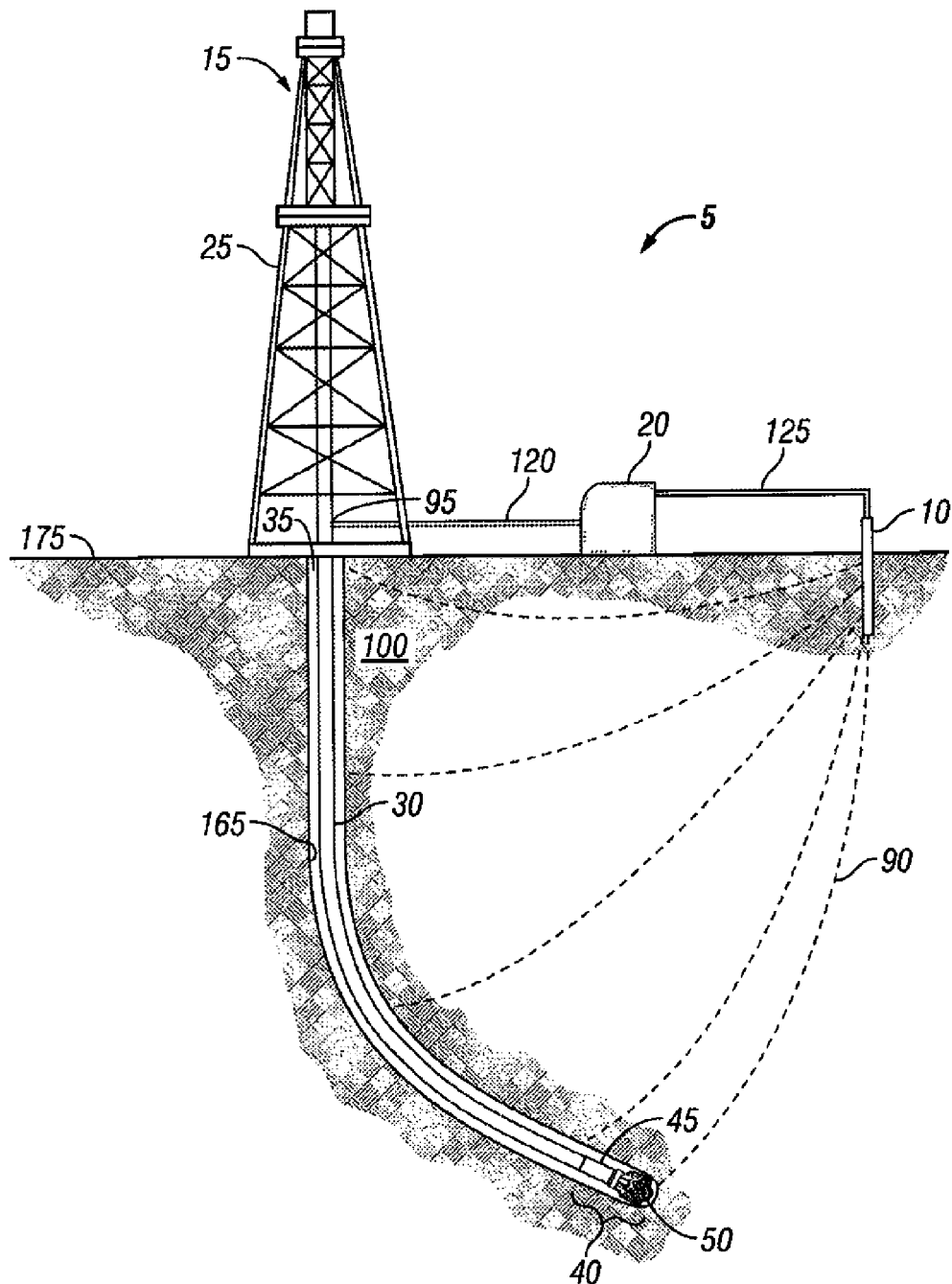
FIG. 1 illustrates an embodiment of a telemetry system including a first electrode, a downhole tool, and a second electrode at a drilling rig.

FIG. 1 illustrates a telemetry system 5 including a first electrode 10, a drilling rig 15, and a control station 20. First electrode 10 includes any device suitable for transmitting electric current 90 into formation 100. For instance, first electrode 10 may be a stake, rod, or any other suitable electrode. In some embodiments, first electrode 10 is composed of an electrically conductive material. In an embodiment, first electrode 10 is composed of metal, alloy, or combinations thereof. In other embodiments, first electrode 10 comprises electrically conductive material and any other material suitable for facilitating electrical contact between first electrode 10 and formation 100. In an embodiment as shown in FIG. 1, a portion of first electrode 10 is embedded in formation 100. It is to be understood that a sufficient portion of first electrode 10 is embedded in formation 100 to allow electric current 90 to flow into formation 100. In alternative embodiments (not illustrated), all of first electrode 10 is embedded in formation 100. In alternative embodiments (not illustrated), first electrode 10 is disposed on surface 175. In such alternative embodiments, first electrode 10 has a sufficient electrical contact with surface 175 to allow electric current 90 to flow into formation 100. In other alternative embodiments (not illustrated), telemetry system 5 has more than one first electrode 10.

Drilling rig 15 includes derrick 25 and drill string 30. Drill string 30 is suspended within wellbore 35 and includes bottomhole assembly 40. Bottomhole assembly 40 includes drill bit 50 at its lower end. Bottomhole assembly 40 also includes downhole tool 45. Downhole tool 45 may include any tool suitable for use in wellbore 35. For instance, downhole tool 45 may include logging-while-drilling tools, measuring-while-drilling tools, and the like. Bottomhole assembly 40 is not limited to having only downhole tool 45 and drill bit 50 as shown in FIG. 1 but instead may also include other components such as other formation property measurement tools, stabilizers, an interface sub, a mud motor, drill collars, and the like.

Figure 2:
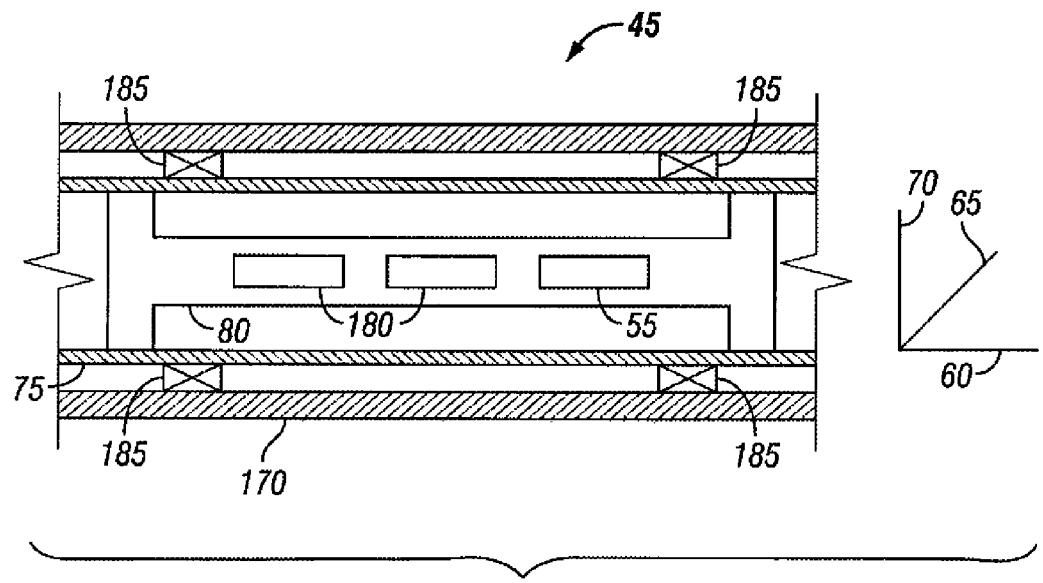
FIG. 2 illustrates a downhole tool with a sensor unit disposed in the chassis.

As illustrated in FIG. 2, downhole tool 45 includes sensor unit 55, housing 75, and chassis 80. Sensor unit 55 may include any sensors suitable for detecting electric current 90. Without limitation, sensor unit 55 may include magnetometers, a voltage sensor 105, and/or a current measuring sensor. The magnetometers may include any magnetometer suitable for measuring the induced magnetic filed resulting from the flowing electric current 90. In an embodiment, the magnetometer may include a magnetometer of downhole tool 45 that may be used to sense the earth's magnetic field of downhole tool 45. Sensor unit 55 may be located on housing 75, chassis 80, and/or collar 170. In alternative embodiments, sensor unit 55 includes voltage sensor 105, a current measuring sensor, or any combination thereof.

Figure 3:
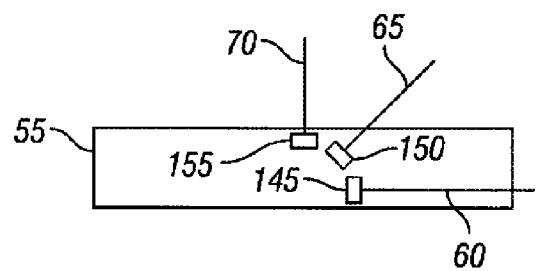
FIG. 3 illustrates a sensor unit with three sensors measuring a magnetic field along three axes.

FIG. 2 illustrates an embodiment of downhole tool 45 in which sensor unit 55 is disposed on chassis 80. Sensor unit 55 may include one sensor or any suitable number of sensors for detecting electric current 90. The sensors may be disposed at any suitable location on chassis 80. In embodiments, sensor unit 55 includes sensors disposed to detect the x-direction 60, the y-direction 65, and/or the z-direction 70 of an electromagnetic field of electric current 90 at downhole tool 45. In an embodiment, sensor unit 55 includes three sensors disposed orthogonal to each other, with each sensor detecting a corresponding x-direction 60, y-direction 65, or z-direction 70. For instance, FIG. 3 illustrates an embodiment of sensor unit 55 having three sensors (e.g., magnetometers) 145, 150, 155 that are disposed orthogonal to each other. As illustrated, x-direction sensor 145 measures a magnetic field in x-direction 60, y-direction sensor 150 measures a magnetic field in y-direction 65, and z-direction sensor 155 measures a magnetic field in z-direction 70. In an embodiment, the sensors are magnetometers. In alternative embodiments, the sensors are not orthogonal. In other alternative embodiments, the sensors may detect the magnetic field in any direction. It is to be understood in some instances that electric current 90 in y-direction 65 and/or z-direction 70 may be bent to x-direction 60 by providing a low resistant path or by any other suitable means. In such an alternative embodiment, sensor unit 55 may detect a magnetic field in x-direction 60.

As shown in FIG. 2, sensor unit 55 is disposed on chassis 80. The sensors of sensor unit 55 may be disposed on chassis 80 in any manner suitable for detecting an electromagnetic field at downhole tool 45. Telemetry system 5 is not limited to sensor unit 55 disposed on chassis 80. In alternative embodiments (not illustrated), sensor unit 55 is disposed on any suitable location in downhole tool 45 such as in housing 75, collar 170, and/or chassis 80. For instance, sensors may be disposed at more than one location (i.e., may be disposed on housing 75, collar 170, and/or chassis 80). As further shown in FIG. 2, downhole tool 45 includes spacers 185. Spacers 185 may have any suitable configuration for separating housing 75 and collar 170. Downhole tool 45 may include any suitable number of spacers 185 for separating housing 75 and collar 170. In some embodiments, downhole tool 45 also includes electronics board 180. Electronics board 180 may include any suitable electronics related to downhole tool 45. For instance, electronics board 180 may include a converter, microprocessor, and the like.

Figure 4:
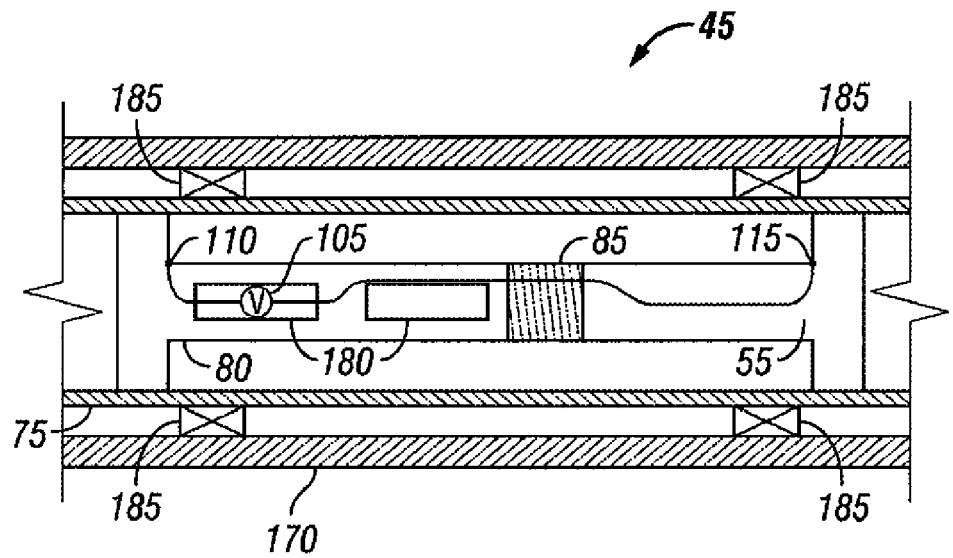
FIG. 4 illustrates an embodiment of a downhole tool in which a sensor unit includes a high impedance gap located in the chassis.

FIG. 4 illustrates a cross-sectional side view of an embodiment of downhole tool 45 in which sensor unit 55 includes voltage sensor 105 for detecting electric current 90 and also includes high impedance gap 85 disposed on chassis 80. Voltage sensor 105 detects electric current 90 by measuring the potential difference between contact points 110, 115 across high impedance gap 85. Contact points 110, 115 are disposed at any suitable location on chassis 80 on opposing sides of high impedance gap 85. In some embodiments, contact points 110, 115 are located at opposing locations on chassis 80 distal to high impedance gap 85. High impedance gap 85 comprises any material that resists the flow of electric current and is suitable for use in a downhole tool. For instance, high impedance gap 85 may be comprised of polyethylene, silicon dioxide, or combination thereof. Voltage sensor 105 may include any voltage sensor suitable for measuring a potential difference in a downhole tool and for converting current into voltage. High impedance gap 85 may be disposed at any suitable location on downhole tool 45 for resisting the flow of electric current 90. In embodiments, high impedance gap 85 is disposed on housing 75, chassis 80, and/or collar 170. In an embodiment as illustrated in FIG. 4, high impedance gap 85 is disposed on chassis 80.

Figure 5:
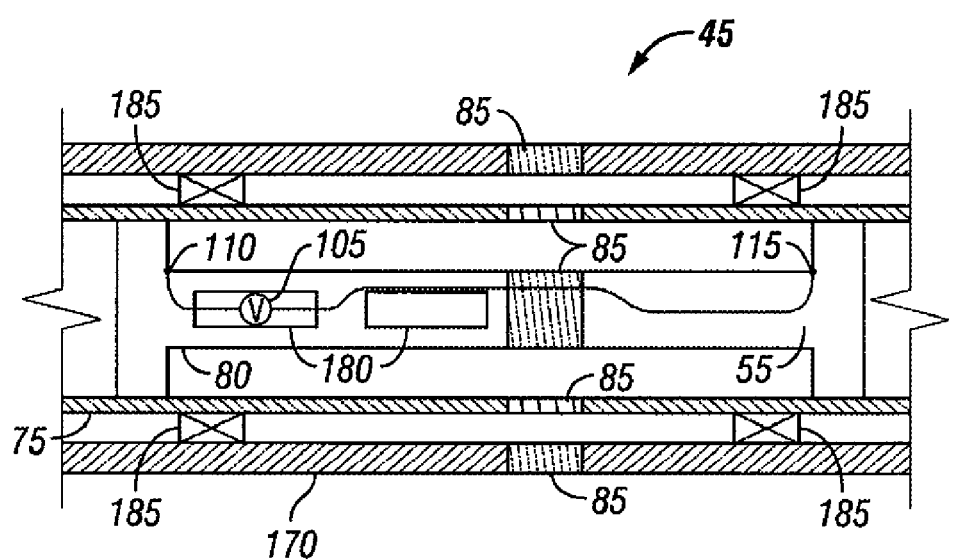
FIG. 5 illustrates an embodiment of a downhole tool in which a sensor unit includes high impedance gaps located in multiple locations.

FIG. 5 illustrates a cross-sectional side view of an alternative embodiment of downhole tool 45 in which high impedance gaps 85 are located on housing 75, chassis 80, and collar 170. Contact points 110, 115 are disposed at any suitable location on housing 75, chassis 80, and/or collar 170 on opposing sides of high impedance gap 85. In some embodiments, contact points 110, 115 are located at opposing locations distal to high impedance gap 85. Voltage sensor 105 may be disposed at any suitable in downhole tool 45. In an embodiment as illustrated in FIGS. 4 and 5, voltage sensor 105 is disposed in an electronics board 180 in chassis 80.

Figure 6:
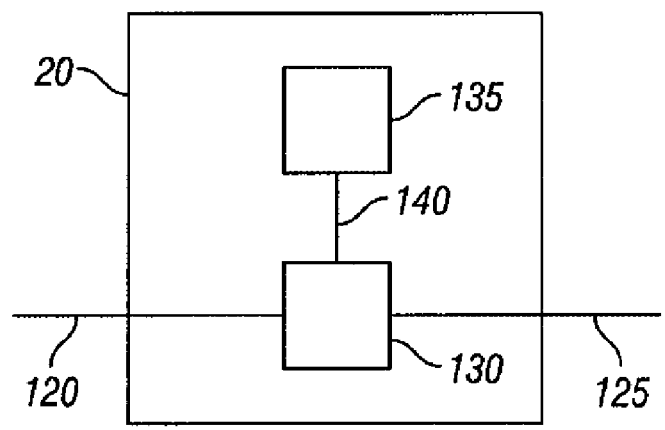
FIG. 6 illustrates a control station including a controller and a downlink box.

As shown in FIG. 1, telemetry system 5 includes control station 20, which is located at surface 175. As shown in FIG. 6, control station 20 includes downlink box 130 and controller 135. Downlink box 130 includes a power supply that provides the electric current to first electrode 10. The power supply may include any power supply suitable for providing an electric current. Downlink box 130 provides an electric current to be detected by first electrode 10 sufficient to reach downhole tool 45. Without being limited by theory, a power source (e.g., downlink box 130) located at surface 175 may not encounter size or power constraints that would be encountered if disposed in wellbore 35, which allows downlink box 130 to include a power supply of sufficient size to overcome low signal situations such as a very deep wellbore 35, a highly conductive formation 100, or the presence of conductive mud. In addition, downlink box 130 may include a processor and related circuitry suitable for receiving and processing communications from controller 135. Downlink box 130 also includes the capacity to modulate the electric current to first electrode 10. Downlink box 130 may modulate the electric current by any suitable method to provide the desired information for downhole tool 45 in electric current 90. In some embodiments, downlink box 130 modulates the phase, frequency, amplitude, or combinations thereof of the electric current. Without limitation, the information provided by the modulation includes data, commands, or any other desired type of information. Any method of modulation suitable for modifying the electric current to encode information on the current may be used. For instance, examples of suitable modulation methods include phase modulation, frequency modulation, or pulse code modulation. Downlink box 130 may also provide the electric current at any desired frequency. In some embodiments, downlink box 130 provides the electric current at a frequency from about 0.1 Hz to about 100 Hz, alternatively from about 0.25 Hz to about 24 Hz. Controller 135 is an electronic device or group of devices capable of controlling the modulation and supply of electric current from downlink box 130. In some embodiments, controller 135 may include a processor, memory, and the like. In an embodiment, controller 135 is a computer. In an embodiment, a user or users may control the operation of downlink box 130 through the use of controller 135. For instance, the user or users may adjust the electric current supplied to first electrode 10 or control the modulation of the electric current. The user or users may be local or remote to drilling rig 15 and may communicate with controller 135 by any suitable method such as by internet, satellite, wireless radiofrequency transmission, and the like. In alternative embodiments (not illustrated), downlink box 130 and controller 135 are not in the same container (e.g., control station 20) but instead are separate, or downlink box 130 and controller 135 may be in a container that has the functionality of both downlink box 130 and controller 135.

Figure 7:
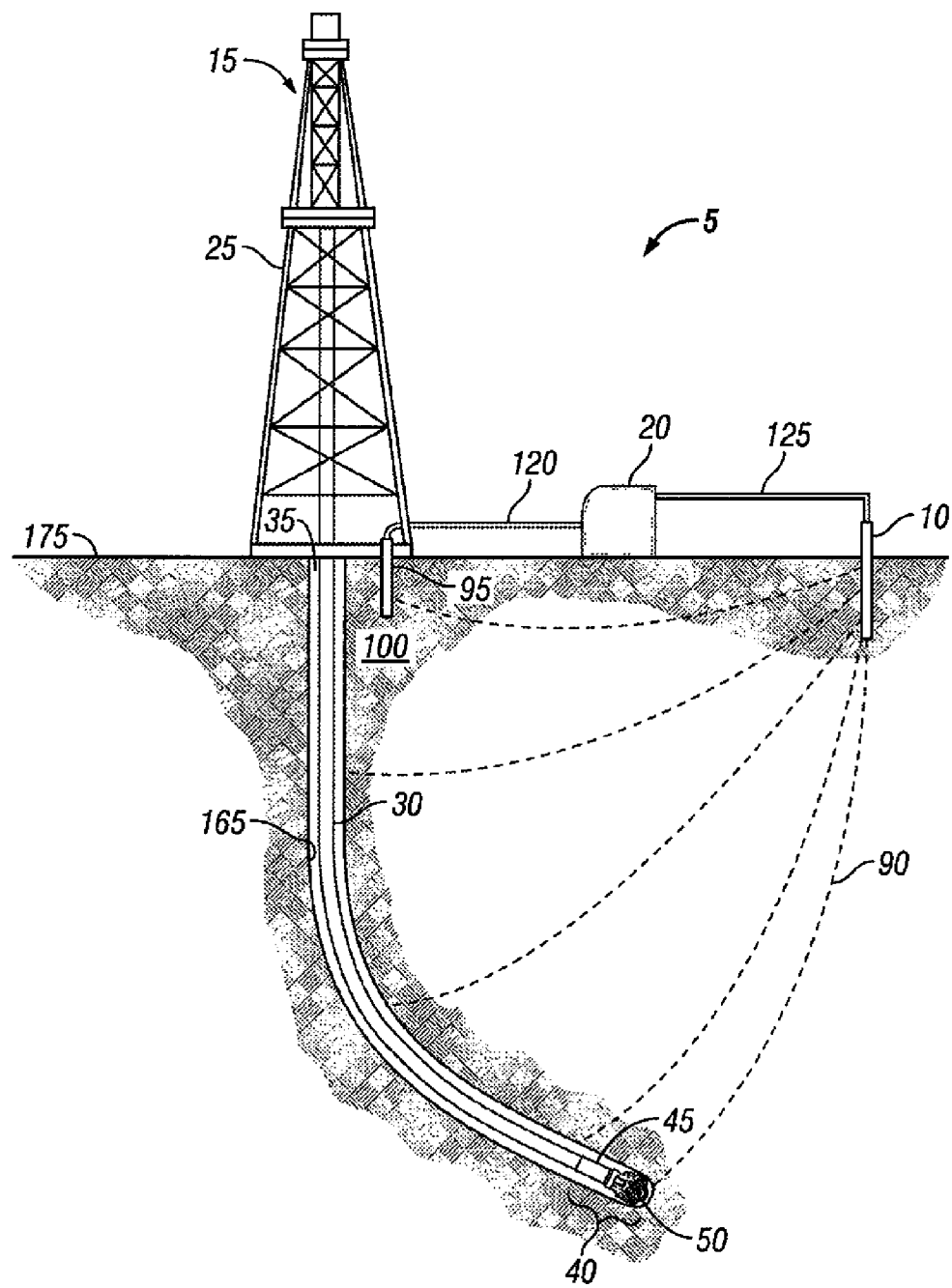
FIG. 7 illustrates an embodiment of a telemetry system having a first electrode, a downhole tool, and a second electrode partially embedded in the formation.

In an embodiment of the operation of telemetry system 5 as illustrated in FIGS. 1, 6, and 7, controller 135 provides instructions to downlink box 130 via communication signals 140 and to downhole tool 45 via electric current 90. Communication signals 140 may include any suitable method of communication between controller 135 and downlink box 130. The instructions may be provided during drilling of wellbore 35 or during a halt in drilling of wellbore 35 (e.g., mud pumps are cycled off). In an embodiment, controller 135 provides instructions to downhole tool 45 via downlink box 130 while mud pumps (not illustrated) are turned off. The instructions may include a command to bottomhole assembly 40. For instance, the instructions may include a command to change the direction of drilling of wellbore 35. Downlink box 130 receives and processes the instructions. Downlink box 130 then provides a modulated electric current via downlink communications link 125 to first electrode 10. Downlink box 130 provides sufficient modulation to the produced electric current to provide a modulated electric current having the desired instructions received from controller 135. Downlink communications link 125 may be any suitable communications link for the transmission of a modulated electric current. For instance, downlink communications link 125 is a cable, wire, or the like. The modulated electric current is provided to first electrode 10 and flows into formation 100 as electric current 90. It is to be understood that the dashed lines of FIG. 1 represent electric current 90 flowing through formation 100. A portion of electric current 90 may flow down formation 100 to drill string 30 and return to second electrode 95 at surface 175 via drill string 30 and/or wellbore casing 165. Some of electric current 90 may flow on downhole tool 45, collar 170, housing 75, and/or chassis 80. In the embodiment as illustrated in FIG. 1, second electrode 95 is a device that is coupled to drilling rig 15 and allows electric current 90 to return to control station 20 via communications link 120. For instance, in such an embodiment, second electrode 95 may be a clamp, hook, or the like. As shown in FIG. 1, second electrode 95 is coupled to drill string 30. Telemetry system 5 is not limited to second electrode 95 being coupled to drill string 30 but instead second electrode 95 may be coupled to any other suitable part of drilling rig 15. In an embodiment, second electrode 95 is coupled to drilling rig 15, drill string 30 suspended in wellbore 35, wellbore casing 165, or any combination thereof. Communications link 120 may be any suitable communications link for the transmission of an electric current. For instance, communications link 120 is a cable, wire, or the like. FIG. 7 illustrates an alternative embodiment of telemetry system 5 in which a portion of second electrode 95 is embedded in formation 100. In such an embodiment, second electrode 95 is any device suitable for allowing electric current 90 to flow from formation 100 to control station 20 via communications link 120. For instance, in such an embodiment, second electrode 95 may be a stake, rod, or the like. In alternative embodiments (not illustrated), all of second electrode 95 is embedded in formation 100. In an embodiment, first electrode 10 is located at any suitable distance from second electrode 95 that allows a sufficient portion of electric current 90 to reach bottomhole assembly 40. Without being limited by theory, electric current 90 may take the least resistant path through formation 100, and the placement of first electrode 10 at a location distal to second electrode 95 may spread out electric current 90 in formation 100 to allow a larger portion of electric current 90 to reach bottomhole assembly 40. In some embodiments, second electrode 95 includes more than one electrode.

In the embodiments as illustrated in FIGS. 1-7, a portion of electric current 90 flows through formation 100 to drill bit 50 and returns via downhole tool 45 and drill string 30. It is to be understood that as electric current 90 flows through downhole tool 45 a magnetic field is created at downhole tool 45. The sensor or sensors (e.g., magnetometers) in sensor unit 55 detect the magnetic field, which includes information provided in the modulated electric current 90. Electronic board 180 interprets the information from the modulated electric current 90. Electronic board 180 may interpret the modulated signal in the magnetic field created by electric current 90 by any suitable method. For instance, in some embodiments, electronic board 180 demodulates the signal. In other embodiments, electronic board 180 correlates the modulated signal with pre-defined waveforms. After interpreting the modulated signal to obtain the information, electronic board 180 communicates the information for the appropriate action. For instance, the modulated signal may contain information to change the direction of drilling. In such instance, electronic board 180 communicates the change of direction command to the drilling assembly in bottomhole assembly 40. In the embodiment illustrated in FIG. 1, electric current 90 flows from downhole tool 45 to second electrode 95 via drill string 30 and/or wellbore casing 165. In the embodiment illustrated in FIG. 7, electric current 90 flows from downhole tool 45 to second electrode 95 via formation 100. From second electrode 95, electric current 90 returns to control station 20 via communications link 120.

Telemetry system 5 also includes uplink telemetry. The uplink telemetry is not electromagnetic telemetry but instead includes other methods of telemetry. In an embodiment, the uplink telemetry includes any method of telemetry suitable for communicating a signal other than electromagnetic telemetry. In some embodiments, the uplink telemetry includes acoustic telemetry, mud pulse telemetry, wired drill pipe, or any combination thereof.

Telemetry system 5 provides a downlink to downhole tool 45 at a much faster rate than conventional methods (e.g., mud pulse). It is to be understood that the amount of time for the downlink to reach downhole tool 45 varies upon conditions such as depth of wellbore 35, the type of formation, and the like.

For instance, in an embodiment, sensor unit 55 may also be part of direction and inclination measurement systems. In such an embodiment, the frequency at which collar 170 is rotating downhole is known by controller 135. Controller 135 may select a carrier frequency of modulation for electric current 90 that does not interfere with the frequency at which collar 170 is rotating downhole.

In the embodiments illustrated in FIGS. 4 and 5, sensor unit 55 detects the modulated signal by voltage sensor 105 measuring the potential difference across high impedance gap 85 between contact points 110 and 115. Electronics board 180 interprets the measured potential difference to obtain the information by any suitable method. The modulated current generates the modulated voltage waveform that may be interpreted in a bit stream containing data and commands.

Figure 8:
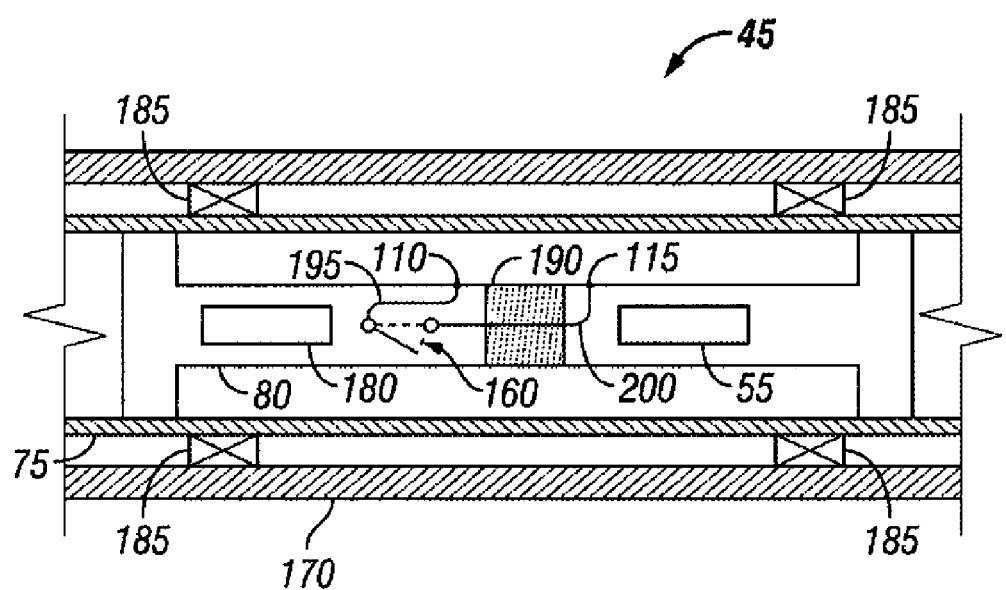
FIG. 8 illustrates an embodiment of a downhole tool with a switch.

FIG. 8 illustrates an embodiment in which chassis 80 includes a switch 160 to control the interruption and resumption of the flow of electric current 90 through chassis 80. In such an embodiment, chassis also includes insulating gap 190. Insulating gap 190 may be composed of any material and have any configuration suitable for stopping the flow of electric current 90. For instance, insulating gap 190 may be composed of ceramic coated metal. It is to be understood that FIG. 8 illustrates an embodiment in which switch 160 is interrupting the flow of electric current 90. Switch 160 may include any switch suitable for use in a downhole tool and for interrupting and resuming flow of electric current 90. In an embodiment, switch 160 is a mechanical switch or an electrical switch. Switch 160 may be controlled by electronics board 180 on downhole tool 45. In an embodiment, switch 160 interrupts flow of electric current 90 during desired operations of downhole tool 45. For instance, switch 160 may interrupt flow of electric current 90 during stationary or continuous surveys. In an embodiment, a stationary survey includes a direction and inclination measurement. During the direction and inclination measurement, switch 160 may interrupt the electric current 90 flow to prevent the flow from interfering with the measurement (e.g., allows the sensors in sensor unit 55 to be used for the stationary survey instead of the downlink). Switch 160 may allow flow of the electric current 90 to resume when the measurement is accomplished. Contact points 110, 115 are disposed on chassis 80 at any suitable locations on opposing sides of insulating gap 190. Contact points 110, 115 have connections 195, 200, respectively, to switch 160. Connections 195, 200 may be any suitable electrical connections. In alternative embodiments (not illustrated), switch 160 controls the interruption and resumption of the flow of electric current 90 through chassis 80, housing 75, collar 170, or any combination thereof. In such alternative embodiments, telemetry system 5 may include any suitable number of switches 160 at suitable locations to sufficiently control the interruption and resumption of the flow of electric current 90.

In some embodiments (not illustrated), downhole tool 45 includes a power source disposed in downhole tool 45 for operation of sensor unit 55 and related electronics (e.g., processor). The power source disposed in downhole tool 45 may be used for powering sensor unit 55 for detecting a downlink with telemetry system 5 when the main power source for downhole tool 45 is not operating. For instance, the main power source for downhole tool 45 may be a turbine/generator, which does not operate when the mud pumps are turned off (e.g., during connections). The power source in downhole tool 45 allows the electronics (e.g., sensors and processor) in sensor unit 55 to operate during a downlink in such an instance when the mud pumps are turned off. With the ability to downlink when mud pumps are turned off, telemetry system 5 allows stationary measurements such as pressure measurements, direction and inclination measurements, and the like to be made with more precision than conventional methods with the mud pumps on. Downhole tool 45 may include any suitable power source for providing power to sensor unit 55 and the related electronics. For instance, the power source may be a re-chargeable battery or a one-time battery.

It is to be understood that telemetry system 5 is not limited to on-shore drilling operations but instead may be used for offshore operations. In an embodiment in which telemetry system 5 is used for offshore operations (not illustrated), first electrode 10 and/or second electrode 95 are located at the sea bed. Communications link 120 and/or downlink communications link 125 may be run from the seabed to the surface. For instance, communications link 120 and/or downlink communications link 125 may be run along the seabed to a riser and brought to the surface along the riser.

FIGS. 1 and 7 are illustrated with bottomhole assembly 40 including only one downhole tool 45. In other embodiments (not illustrated), bottomhole assembly 40 may include more than one downhole tool. In some embodiments, a sensor unit 55 may be disposed on each downhole tool to allow telemetry system 5 to communicate with more than one downhole tool in bottomhole assembly 40. In another embodiment (not illustrated), telemetry system 5 may include a receiver including sensor unit 55 to receive downlink commands via electric current 90. In such another embodiment, the receiver may transmit the downlink commands to other downhole tools via an inter-tool communication bus located in bottomhole assembly 40.

Telemetry system 5 is shown in FIGS. 1 and 7 as including drill string 30. However, it is to be understood that telemetry system 5 is not limited to drill string 30 but instead may include other suitable operations for downhole tools such as operations using a wireline, coiled tubing, completions, or any other uses of a downhole tool in communication with a surface telemetry system.

It is to be understood that telemetry system 5 is not limited to first electrode 10 sending downlinks by electric current 90 and second electrode 95 receiving the returned electric current 90. In alternative embodiments (not illustrated), the functions of first electrode 10 and second electrode 95 may be switched with second electrode 95 operating as the first electrode 10 and first electrode operating as the second electrode 95. For instance, in such alternative embodiments, second electrode 95 (located proximal to drilling rig 15) may receive the modulated electric current from downlink box 130 and send the downlinks by electric current 90 to downhole tool 45 with first electrode 10 (located distal to drilling rig 15) receiving the returned electric current 90.

It is to be further understood that telemetry system 5 is not limited to embodiments illustrated in FIGS. 1 and 7 with first electrode 10 distal to drilling rig 15 and second electrode 95 proximal to drilling rig 15. In alternative embodiments (not illustrated), first electrode 10 and second electrode 95 may be located at any positions suitable for providing downlinks to downhole tool 45 via electric current 90 and receiving the returned electric current 90.

Therefore, it has been found that telemetry system 5 allows control station 20 at surface 175 to direct the sending of downlinks to downhole tool 45 when mud pumps are turned off. Telemetry system 5 also allows downlinks to be sent to downhole tool 45 at a faster rate than conventional methods. In some embodiments, telemetry system 5 also allows for downlinks to downhole tool 45 via electric current 90 about simultaneously as uplinks. In some embodiments, uplink confirmations from the surface system may be sent to downlink box 130 to confirm receipt of the downlink to downhole tool 45.

What is claimed is:

1. A telemetry system for communicating with a downhole tool in a wellbore, comprising:
    a first electrode, wherein a modulated electric current flows from the first electrode through a formation to the downhole tool;
    a downlink box, wherein the downlink box provides the modulated electric current to the first electrode;
    wherein the downhole tool comprises a sensor unit, and wherein the sensor unit detects the modulated electric current;
    a second electrode, wherein the second electrode allows the modulated electric current to return to the downlink box; and
    an uplink telemetry, wherein the uplink telemetry does not comprise electromagnetic telemetry wherein a portion of the first electrode is embedded in the formation outside of the wellbore.

2. The telemetry system of claim 1, wherein the sensor unit comprises at least one magnetometer.

3. The telemetry system of claim 2, wherein the downhole tool comprises a housing, a chassis, and a collar, and wherein the at least one magnetometer is disposed on the housing, the chassis, or the collar.

4. The telemetry system of claim 1, wherein the sensor unit detects a magnetic field generated by the modulated electric current at the downhole tool in any direction.

5. The telemetry system of claim 1, wherein the sensor unit detects a y-direction, a z-direction, or combination thereof of a magnetic field of the modulated electric current at the downhole tool.

6. The telemetry system of claim 1, wherein the sensor unit comprises a voltage sensor, a current measuring sensor, or any combination thereof.

7. The telemetry system of claim 6, wherein the voltage sensor detects the modulated electric current by measuring a potential difference across at least one high impedance gap.

8. The telemetry system of claim 7, wherein the at least one high impedance gap is disposed on a housing of the downhole tool, a chassis of the downhole tool, a collar of the downhole tool, or any combination thereof.

9. The telemetry system of claim 1, wherein the downlink box modulates an electric current to provide the modulated electric current.

10. The telemetry system of claim 1, further comprising a controller, wherein the downlink box receives communications from the controller.

11. The telemetry system of claim 10, wherein a control station comprises the downlink box and the controller.

12. The telemetry system of claim 1, wherein the second electrode is coupled to a drilling rig, a drill string suspended in the wellbore, wellbore casing, or any combination thereof.

13. The telemetry system of claim 1, wherein the first electrode and the second electrode each comprise more than one electrode.

14. The telemetry system of claim 1, wherein the first electrode is located distal to the wellbore, and wherein the second electrode is located proximal to the wellbore.

15. The telemetry system of claim 1, wherein the downhole tool comprises a switch to control interruption and resumption of flow of the modulated electric current through a chassis of the downhole tool, a housing of the downhole tool, a collar of the downhole tool, or any combination thereof.

16. A method of communicating with a downhole tool in a wellbore, comprising:
    (A) directing a modulated electric current into a formation through an electrode embedded in a formation, the electrode remote from the wellbore;
    (B) detecting the modulated electric current at the downhole tool;
    (C) receiving the modulated electric current at a surface of the wellbore; and
    (D) providing an uplink telemetry, wherein the uplink telemetry does not comprise electromagnetic telemetry.

17. The method of claim 16, further comprising providing a sensor disposed on a housing of the downhole tool, a chassis of the downhole tool, or a collar of the downhole tool to accomplish detecting the modulated electric current.

18. The method of claim 16, further comprising measuring a potential difference across a high impedance gap in the downhole tool to accomplish detecting the modulated electric current.

19. The method of claim 16, further comprising operating the uplink telemetry simultaneously with the direction, detection, and receiving.

* * * * *